United States Patent [19]

Kats

[11] Patent Number: 5,663,531

[45] Date of Patent: Sep. 2, 1997

[54] ELECTRONIC WEIGHING APPARATUS UTILIZING SURFACE ACOUSTIC WAVES

[75] Inventor: Vyacheslav D. Kats, Brooklyn, N.Y.

[73] Assignee: Circuits and Systems, East Rockaway, N.Y.

[21] Appl. No.: 489,365

[22] Filed: Jun. 12, 1995

[51] Int. Cl.$^6$ ................................................ G01G 3/14
[52] U.S. Cl. ........................ 177/210 FP; 177/211
[58] Field of Search ........................ 177/211, 210 R, 177/210 FP

[56] References Cited

PUBLICATIONS

"Progress in the Development of SAW Resonator Pressure Transducers" by Cullen et al., 1980 Ultrasonics Symposium, pp. 696–701.

"Pressure and Acceleration Sensitivity of SAW Interferometer" by Staples et al., 1981 Ultrasonics Symposium, pp. 155–158.

Primary Examiner—Michael L. Gellner
Assistant Examiner—Anh Mai
Attorney, Agent, or Firm—David P. Gordon

[57] ABSTRACT

An electronic weighing apparatus includes a base which supports a cantilevered elastic member upon which a load platform is mounted. The free end of the elastic member is provided with a first piezoelectric transducer and a second piezoelectric transducer is supported by the base. Each transducer includes a substantially rectangular piezoelectric substrate and a pair of electrodes imprinted on the substrate at one end thereof. The transducers are arranged with their substrates substantially parallel to each other with a small gap between them and with their respective electrodes in relatively opposite positions. The electrodes of the second transducer are coupled to the input of an amplifier and the output of the amplifier is coupled to the electrodes of the first transducer. The resulting circuit is a positive feedback loop with a "delay line" in which a surface acoustic wave in one substrate is effectively induced into the other. When a load is applied to the load platform, the free end of the cantilevered elastic member moves and causes the first transducer to move relative to the second transducer. The movement of the first transducer relative to the second transducer causes a change in the frequency at the output of the amplifier which is used to determine the displacement of the elastic member and thus the weight of the applied load.

19 Claims, 6 Drawing Sheets

ELECTRONIC WEIGHING APPARATUS UTILIZING SURFACE ACOUSTIC WAVES

BACKGROUND OF THE INVENTION

1. Field of the Invention

The invention relates to electronic weighing devices. More particularly, the invention relates to an electronic weighing device which employs surface acoustic waves to measure weight.

2. State of the Art

From very early times, civilizations used weighing machines in business transactions. The simplest form of a weighing machine is called the balance because it balances two loads from opposite ends of a horizontal bar. The Egyptians used balance instruments more than 4,000 years ago. They balanced a beam from a vertical support and suspended two pans from either end of the beam. One pan held a known weight. While the other held the object to be weighed. The delicate mechanical precision balances still used today in scientific laboratories are based on the same principles. The first true precision balance was probably built around 1770. The precision balance achieved its accuracy by using an adjustable center of gravity and a knife-sharp fulcrum. Modern precision balances, known as macrobalances, are sensitive enough to measure loads up to 200 grams to the nearest 0.1 milligram. Even more sensitive balances, called microbalances, can weigh a maximum load of 0.1 gram to the nearest 1 millionth of a gram. Most precision balances are kept in glassed-in cabinets so that they are unaffected by external temperature changes and drafts.

Balances require the use of a known, or standardized, weight which is at least equal to the heaviest load to be weighed. For weighing heavier loads, there are scales based on the "steelyard" which was first invented by the Romans. The steelyard has a suspended beam with two unequal arms or levers which allows the use a small weight to balance a heavy load. The load is hung from the short arm, near the fulcrum, and a weight, or counterpoise, is moved along the longer arm until a balance is reached. Markings on the long arm indicate the weight.

Spring scales were invented around 1700. Spring scales may be either compression-type or tension-type. In either case, the stretching or compressing of a spring moves a pointer to register the weight on a dial or moves a portion of a transducer to provide an electrical signal which is then used to register weight electronically.

Modern electronic scales measure loads faster than traditional scales or balances and electronic measurements are easily displayed, stored, and transmitted. Electronic scales use one of three principal mechanisms: the strain-gauge load cell, the pressductor, or the force balance. In load cell scales, the applied weight compresses a column which has a strain gauge bonded to its surface. The strain gauge is a fine wire which undergoes a change in electrical resistance when it is either stretched or compressed. A measurement of this change in resistance yields a measure of the applied weight.

A pressductor is a laminated magnetic block with four holes drilled through it. A wire carrying alternating current is threaded through two of the holes, and a pickup wire connected to a voltage meter is threaded through the other two holes. In the absence of a load, no voltage is detected by the pickup wire. However, an applied load induces a voltage that is proportional to the weight. Both the load cell and the pressductor are used to measure relatively large weights, e.g. from 1 kilogram to many tons.

The force balance utilizes a moving electromagnetic coil which is deflected by an applied weight. The deflection is corrected by a balancing current which is proportional to the deflecting weight. Force balance scales are used to measure relatively small weights.

Throughout history new and improved scales have been designed to achieve greater accuracy and to simplify their use. Currently, the most accurate scales are not simple to use and their range of accuracy is limited, i.e. they are only accurate for a certain range of weight. Moreover, accurate scales are relatively expensive.

SUMMARY OF THE INVENTION

It is therefore an object of the invention to provide an electronic weighing apparatus which is accurate and easy to use.

It is also an object of the invention to provide an electronic weighing apparatus which is accurate over a broad range of weights.

It is another object of the invention to provide an electronic weighing apparatus which is compact and easy to construct.

It is a further object of the invention to provide an electronic weighing apparatus which is inexpensive to manufacture.

In accord with these objects which will be discussed in detail below, the electronic weighing apparatus of the present invention includes a base which supports a cantilevered elastic member upon which a load platform is mounted. The free end of the elastic member is provided with a first piezoelectric transducer and a second piezoelectric transducer is supported by the base. Each transducer includes a substantially rectangular piezoelectric substrate and a pair of electrodes imprinted on the substrate at one end thereof, with one pair of electrodes acting as a transmitter and the other pair of electrodes acting as a receiver. The transducers are arranged with their substrates substantially parallel to each other with a small gap between them and with their respective electrodes in relatively opposite positions. The receiver electrodes of the second transducer are coupled to the input of an amplifier and the output of the amplifier is coupled to the transmitter electrodes of the first transducer. The transducers form a "delay line" and the resulting circuit of the delay line and the amplifier is a positive feedback loop, i.e. a natural oscillator. More particularly, the output of the amplifier causes the first transducer to emit a surface acoustic wave ("SAW") which propagates along the surface of the first transducer substrate away from its electrodes. The propagating waves in the first transducer induce an oscillating electric field in the substrate which in turn induces similar SAW waves on the surface of the second transducer substrate which propagate in the same direction along the surface of the second transducer substrate toward the electrodes of the second transducer. The induced waves in the second transducer cause it to produce an alternating voltage which is supplied by the electrodes of the second transducer to the amplifier input. The circuit acts as a natural oscillator, with the output of the amplifier having a particular frequency which depends on the physical characteristics of the transducers and their distance from each other, as well as the distance between the respective electrodes of the transducers.

According to the invention, when a load is applied to the load platform, the free end of the cantilevered elastic member moves and causes the first transducer to move relative to the second transducer. The movement of the first transducer relative to the second transducer causes a change in the frequency at the output of the amplifier. The movement of the elastic member is proportional to the weight of the applied load and the frequency and/or change in frequency at the output of the amplifier can be calibrated to the displacement of the elastic member.

The frequency response of the delay line is represented by a series of lobes. Each mode of oscillation is defined as a frequency where the sum of the phases in the oscillator is an integer multiple of $2\pi$. Thus, as the frequency of the oscillator changes, the modes of oscillation move through the frequency response curve and are separated from each other by a phase shift of $2\pi$. The mode at which the oscillator will oscillate is the one having the least loss.

According to a preferred embodiment of the invention, the transducers are arranged such that their displacement over the weight range of the weighing apparatus causes the oscillator to oscillate in more than one mode. Therefore, the change in frequency of the oscillator as plotted against displacement of the transducers is a periodic function. The invention provides several different ways of determining the cycle of the periodic function so that the exact displacement of the elastic member may be determined. In addition, in order to minimize the possibility that the oscillator will oscillate in two modes at the same time, the frequency response of the delay line is arranged so that no more than two modes coexist in the main lobe of the frequency response curve. This is achieved by the topology of the electrodes as well as the distance between the transmitting electrode and the receiving electrode. The gain of the amplifier is also chosen to be at least the absolute value of the greatest loss expected to be encountered at an oscillating frequency within the main lobe but not great enough to allow oscillation in two modes simultaneously.

According to a presently preferred embodiment of the invention, the surface acoustic wave has a wavelength of approximately 200 microns at 20 MHz. The gap between the substrates of the first and second transducers is as small as possible and preferably is less than one half to one wavelength, i.e. 100–200 microns. The amplifier preferably has a gain of at least approximately 17 dB in order to guarantee natural oscillation, and preferably not more than approximately 22 dB so that the oscillator oscillates in only one mode at a time. The presently preferred manner of determining the cycle of the periodic output of the amplifier is to provide a second pair of transducers adjacent to the first pair and coupled to each other in the same type of delay line feedback loop. The second pair of transducers utilize a SAW with a different wavelength than the first pair of transducers, e.g. approximately 220 microns at 18 MHz. The output of the second amplifier is, therefore, a periodic function with a different frequency than the periodic function which is the output of the first amplifier. By combining the outputs of both amplifiers, a unique value is provided for each position of the elastic member.

Typically, the elastic member is chosen so that it will bend up to 700 microns under maximum load. Given the wavelength of the SAW, this results in three to four repeating cycles in the output of the first amplifier.

The provided apparatus can achieve an accuracy on the order of one part in one hundred thousand, e.g. one gram per hundred kilograms. The components of the apparatus are easily manufactured and the assembly of the apparatus is inexpensive. The circuit which is coupled to the outputs of the amplifiers may be provided with self-calibration capability and can be provided with a user-friendly interface so that the apparatus is easy to use.

Additional objects and advantages of the invention will become apparent to those skilled in the art upon reference to the detailed description taken in conjunction with the provided figures.

DETAILED DESCRIPTION OF THE PREFERRED EMBODIMENTS

Referring now to FIGS. 1, 2, 2a and 2b, an electronic weighing apparatus 10 according to the invention includes a base 12 which supports a cantilevered elastic member 14 having a cutout 15, and upon which a load platform 16 is mounted. The free end 18 of the elastic member is provided with a first piezoelectric transducer 20 and a second piezoelectric transducer 22 is supported by the base 12. Optionally, as described in more detail below, the elastic member 14 is provided with a strain gauge 17 or other means of determining gross position.

Figure 1:
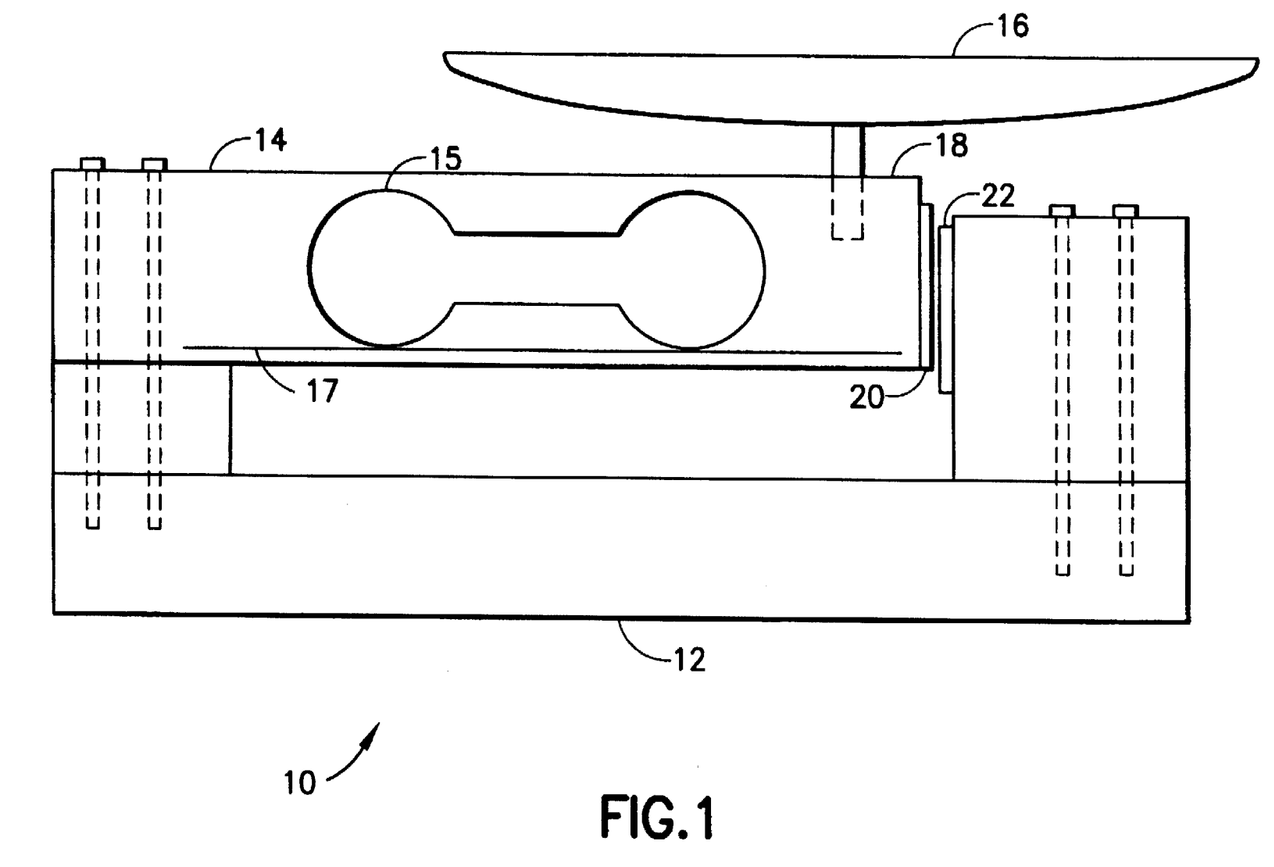
FIG. 1 is a side elevation view of an exemplary embodiment of the invention.
Figure 2:
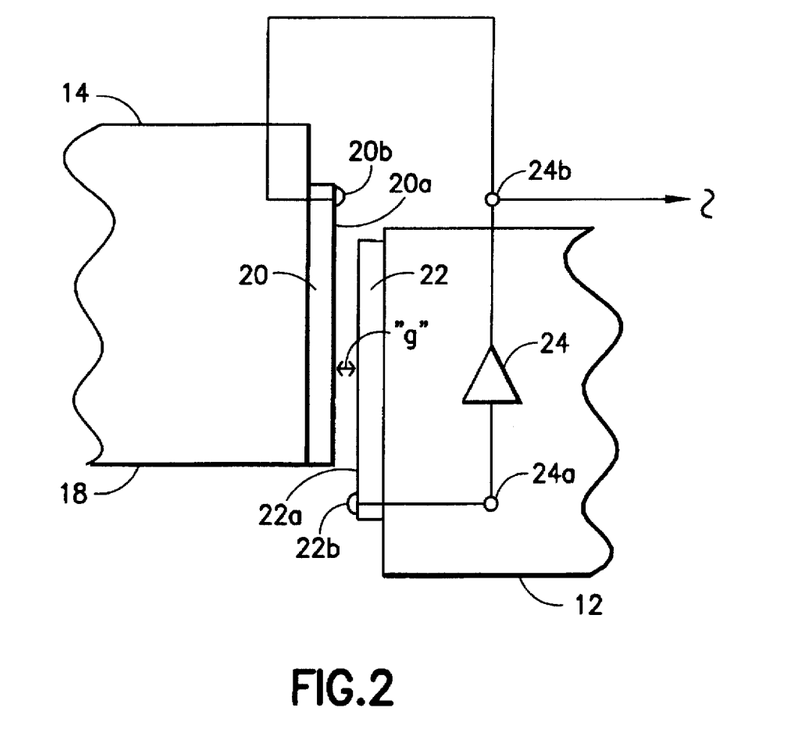
FIG. 2 is an enlarged broken side elevation and partially schematic view of a pair of transducers coupled in a feedback circuit.
Figure 2A:
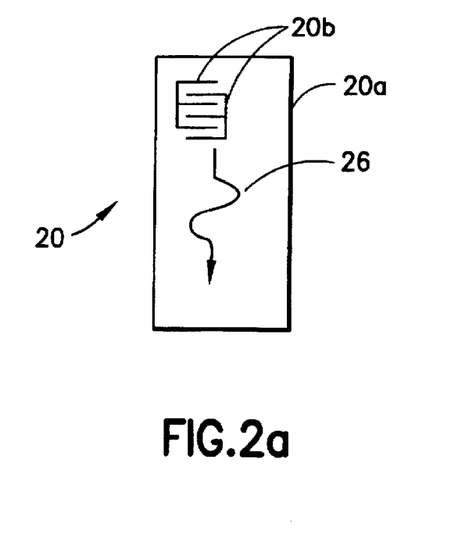
FIG. 2a is an enlarged plan and partially schematic view of a first transducer.
Figure 2B:
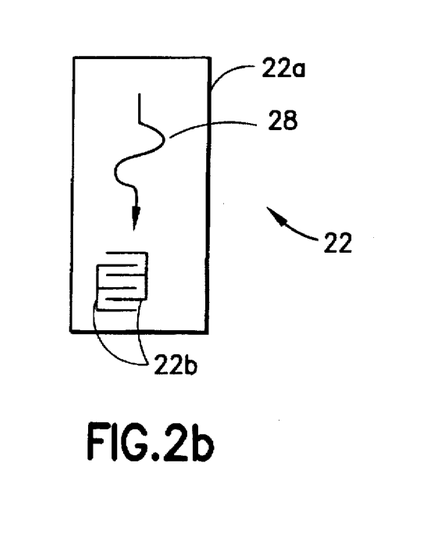
FIG. 2b is an enlarged plan and partially schematic view of a second transducer.

The first transducer 20 includes a substantially rectangular piezoelectric substrate 20a and a pair of electrodes 20b imprinted on the substrate at the upper end thereof. The second transducer 22 includes a substantially rectangular piezoelectric substrate 22a and a pair of electrodes 22b imprinted on the substrate at the lower end thereof. The transducers are arranged with their substrates substantially parallel to each other with a small gap "g" between them. The electrodes 22b of the second transducer 22 are coupled to the input 24a of an amplifier 24 powered by a power source (not shown) and the output 24b of the amplifier 24 is coupled to the electrodes 20b of the first transducer 20. The resulting circuit is a positive feedback loop natural oscillator with a "delay line". The output 24b of the amplifier 24 generates an alternating voltage in the electrodes 20b of the first transducer 20 which generates a surface acoustic wave ("SAW") 26 which propagates along the surface of the first transducer substrate 20a away from its electrodes 20b. Since the substrate 20a of the first transducer 20 is relatively close to the substrate 22a of the second transducer 22, an oscillating electric field which is induced as a result of the SAW waves 26 in the piezoelectric substrate 20a is able to in turn induce similar SAW waves 28 on the surface of the second transducer substrate 22a which propagate in the same direction along the surface of the second transducer substrate toward the electrodes 22b of the second transducer 22. The induced waves 28 in the second transducer 22 cause the electrode 22b of the second transducer 22 to produce an alternating voltage which is provided to the input 24a of the amplifier 24. As long as the gain of the amplifier 24 is larger than the loss of the system, the circuit acts as a natural oscillator with the output 24a of the amplifier 24 having a particular frequency which depends on the physical characteristics of the transducers and their distance from each other, as well as the distance between the respective electrodes of the transducers. In particular, the frequency of the oscillator is directly related to the time it takes for the SAW to propagate from the electrodes 20b to the electrodes 22b.

According to a presently preferred embodiment of the invention, the SAW 26 has a wavelength of approximately 200 microns at 20 MHz. In order to limit loss in the system, the gap "g" between the substrates of the first and second transducers is as small as possible and preferably no more than one half to one wavelength, i.e. 100–200 microns. With such a gap, an oscillating system can typically be generated if the amplifier 24 has a gain of at least approximately 17 dB. The electrodes 20b are preferably imprinted on the substrate 20a so that they include a reflecting means (as is known in the art of SAW wave transmitters) for increasing the amplitude of the SAW in the direction shown in FIG. 2a.

Referring now to FIGS. 1, 2, 2a, and 2b, it will be appreciated that when a load (not shown) is applied to the load platform 16, the free end 18 of the cantilevered elastic member 14 moves down and causes the first transducer 20 to move relative to the second transducer 22. In particular, it causes the electrodes 20b of the first transducer 20 to move closer to the electrodes 22b of the second transducer 22. This results in a shortening of the "delay line". The shortening of the delay line causes an increase in the frequency at the output of the amplifier. The displacement of the elastic member is proportional to the weight of the applied load and the frequency or increase in frequency at the output of the amplifier can be calibrated to the distance moved by the elastic member.

Figure 3:
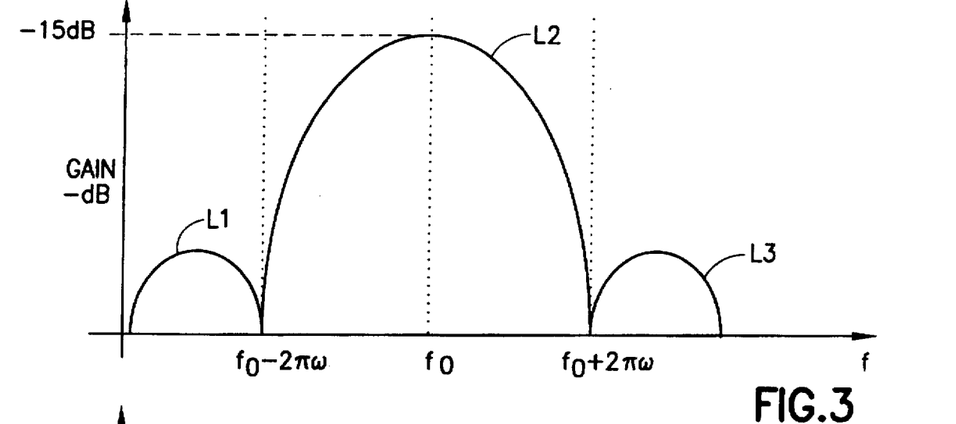
FIG. 3 is a graph of a portion of a frequency response curve for a delay line according to the invention showing three modes of oscillation.
Figure 3A:
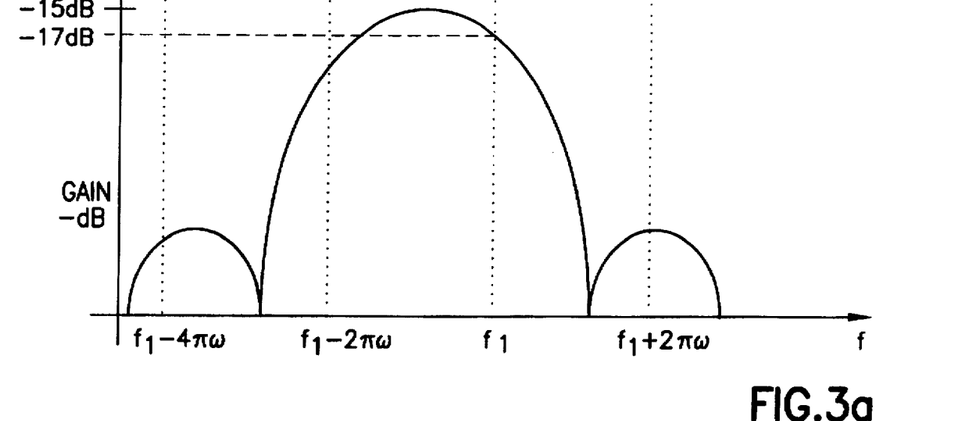
FIG. 3a is a graph similar to FIG. 3 showing four modes of oscillation at points just prior to a mode change.
Figure 3B:
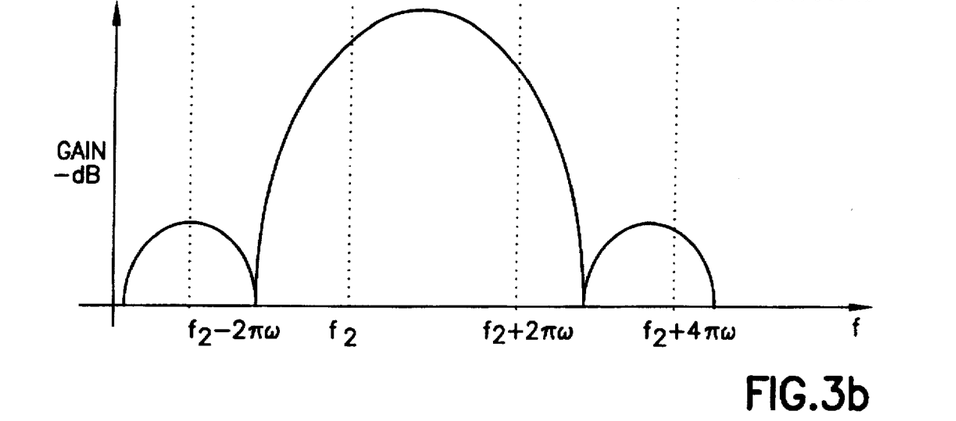
FIG. 3b is a graph similar to FIG. 3 showing four modes of oscillation at points just subsequent to a mode change.

Turning now to FIGS. 3, 3a, and 3b, the frequency response of the delay line is represented by a series of lobes, e.g. L1, L2, and L3 which represent possible frequencies of oscillation of the oscillator circuit, i.e. where the gain is greater than the loss. The central or main lobe L2 includes the frequencies at which the oscillator has the lowest loss. The frequency $f_0$ is the frequency in the main lobe L2 where the circuit has the minimum loss. Since the frequency response curve is divided into these lobes, it will be understood that there are some frequencies at which the circuit will not oscillate. Moreover, it will be appreciated that the circuit will attempt to oscillate at the frequency having the least loss and that the frequency of oscillation may change modes to achieve the lowest loss. The different modes of oscillation are frequencies which have a phase shift of multiples of $2\pi$. For example, three modes of oscillation, $f_0$, $f_0+2\pi\omega$, and $f_0-2\pi\omega$, are shown in FIG. 3, where $\omega$ is a constant. Since the loss in frequency response among these modes is the lowest at the frequency $f_0$, the oscillator will oscillate at $f_0$.

As mentioned above, as the distance in the delay line is shortened, the frequency of the oscillator increases. For example, when the first transducer 20 is moved under the influence of a load applied to the elastic member 14 (FIG. 1), the frequency of the oscillator will rise from $f_0$ (FIG. 3) to $f_1$ (FIG. 3a). At this new frequency $f_1$, the frequency response of the delay line exhibits many modes of oscillation, four of which, $f_1$, $f_1+2\pi\omega$, $f_0-2\pi\omega$, and $f_0-4\pi\omega$, are shown in FIG. 3a. As shown in FIG. 3a, $f_1$ is the frequency of the mode with the lowest loss; but the loss at the mode having the frequency $f_1-2\pi\omega$ is almost as low as the mode having the frequency $f_1$. If the delay line is shortened further by increasing the load on the elastic member, the frequency of the oscillator will increase beyond the frequency $f_1$ to a frequency $f_2+2\pi\omega$ shown in FIG. 3b. Referring to FIG. 3b, it will be appreciated that when the frequency of the oscillator is brought to $f_2+2\pi\omega$, many nodes of oscillation are possible, including: $f_2$, $f_2+2\pi\omega$, $f_2-2\pi\omega$, and $f_2+4\pi\omega$. It will also be appreciated from FIG. 3b that the loss in response at the mode having the frequency $f_2$ is less than the loss at the mode having the frequency $f_2+2\pi\omega$. The oscillator will therefore change modes of oscillation and oscillate at a lower frequency, i.e. $f_2$.

If desired, the changing of the modes of oscillation can be avoided by limiting the displacement of the first transducer so that the frequency of the oscillator is never brought beyond the frequency at which the mode of oscillation would change. By designing the delay line to exhibit an appropriate frequency response, it is possible to allow the length of the delay line to change by up to one wavelength before the mode of oscillation changes. In the example given above, the length of the delay line could be shortened by about 200 microns, i.e. the elastic member could be displaced by about 200 microns without causing a change in the mode of oscillation. Such a small displacement would either limit the range of weight measurement or would reduce the "resolution" (accuracy) of the measurement depending on the characteristics of the elastic member. For example, a "soft" elastic member could be used for measuring a small range of light weights, and a "stiff" elastic member could be used for measuring a broad range of weights with limited accuracy. According to the preferred embodiment of the invention, the length of the delay line is permitted to change by about 700 microns and the mode of oscillation is therefore permitted to change three to four times.

Figure 4:
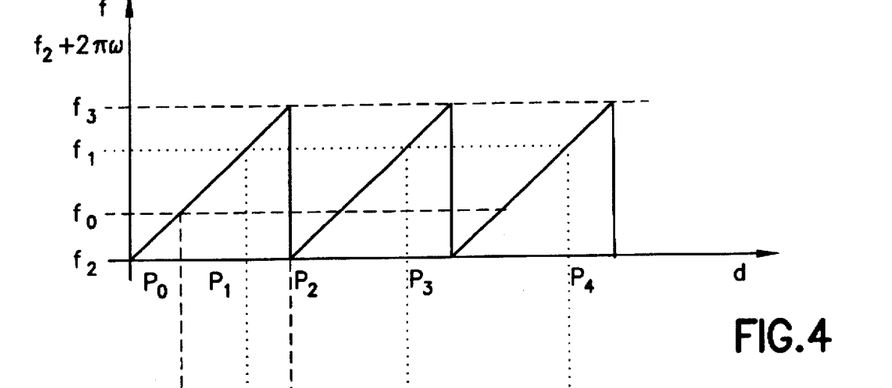
FIG. 4 is a graph of a periodic function representing the output of a first amplifier.

FIG. 4 illustrates the frequency "f" of the output of the amplifier 24 as a function of displacement "d" of the elastic member 14. When the elastic member is displaced from a resting point $P_0$ to a first position $P_1$, the frequency of the amplifier output increases from a first frequency $f_0$ to a second frequency $f_1$. As mentioned above, due to the frequency response of the delay line, when the elastic member is displaced to a position $P_2$, the oscillator changes mode of oscillation and oscillates at a lower frequency $f_2$ rather than the higher frequency $f_2+2\pi\omega$. Eventually, the range of frequencies will repeat through $f_1$ at position $P_3$ until the mode changes again, etc. Thus, the frequency output of the amplifier will be a periodic function with the same frequencies generated at different displacements of the elastic member. For example, as shown in FIG. 4, the same frequency $f_1$ will be representative of different displacement positions $P_1$, $P_3$, and $P_4$ of the elastic member 14.

Figure 4A:
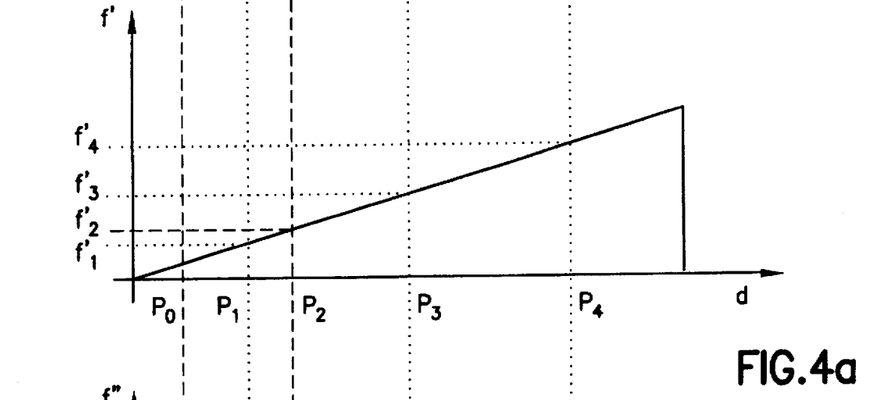
FIG. 4a is a graph representing the output of a complementary pick-up.
Figure 4B:
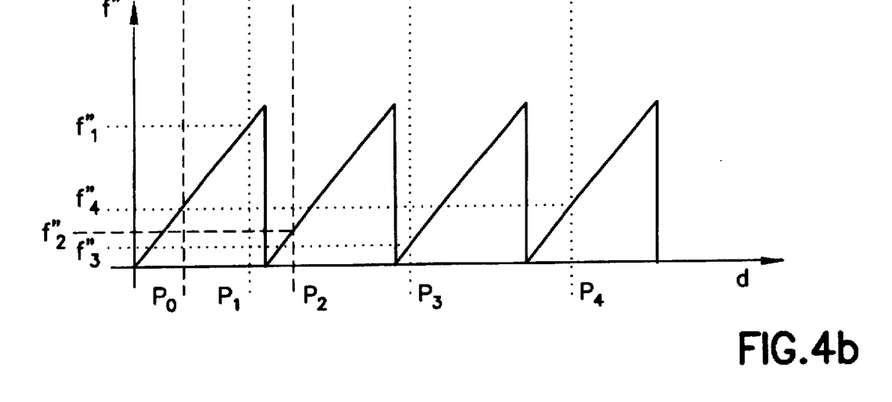
FIG. 4b is a graph of a periodic function representing the output of a second amplifier.

There are several ways of determining which of the positions $P_1$, $P_3$ or $P_4$ represents the true displacement of the elastic member when the frequency is $f_1$. For example, it is possible to monitor the output of the amplifier 24 and count the number of times the frequency drops and then rises and apply modular arithmetic to calculate the correct position of the elastic member. Alternatively, as suggested above and shown in FIG. 1, the elastic member 14 can be provided with a gross displacement detector 17 such as a strain gauge, a capacitance or inductance transducer, or the like which generates a non-periodic output. FIG. 4a illustrates the alternative method wherein a strain gauge or other "gross" position transducer is coupled to the elastic member to provide a non-periodic signal f' in response to the displacement of the elastic member. The signal f' need not represent a very accurate indication of the position of the elastic member. It is sufficient that the signal f' be accurate enough to determine how many cycles of the periodic function f have been traversed. Thus, as shown in FIGS. 4 and 4a, when the elastic member is displaced to positions $P_1$, $P_3$ or $P_4$, three distinct signals $f'_1$, $f'_3$, and $f'_4$ are generated by the gross position transducer. Each cycle of the periodic signal f is represented by a range of signals f'. Therefore, by comparing the signal f' to a look-up table, the correct cycle of the function f can be determined and modular arithmetic with interpolation used to determine the correct displacement of the elastic member. According to a presently preferred embodiment (discussed below with reference to FIG. 5), however, a second periodic function f", as shown in FIG. 4b, is generated and combined with or compared to the periodic function f as described in detail below.

Figure 5:
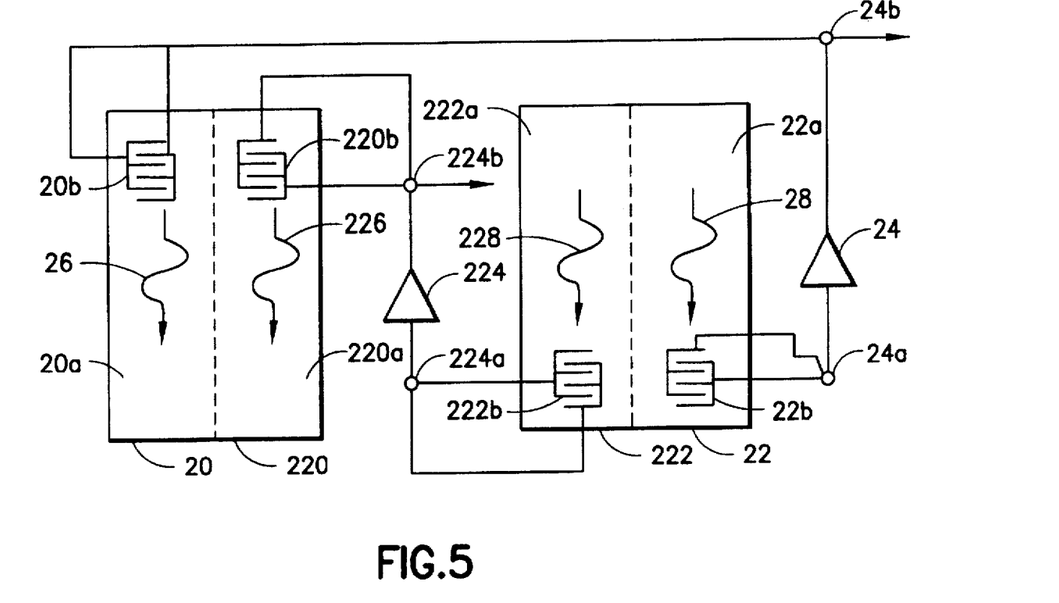
FIG. 5 is an enlarged plan and partially schematic view of two pair of complementary transducers.

Turning now to FIG. 5, the presently preferred manner of determining the cycle of the periodic output of the amplifier 24 is to provide a second pair of transducers 220, 222 adjacent to the first pair 20, 22 and coupled to each other in the same type of delay line feedback loop via a second amplifier 224. The second pair of transducers generate and detect a SAW 226, 228 having a longer wavelength, e.g. 220 microns at 18 MHz, than the SAW 26, 28 utilized by the first pair of transducers. Therefore, the output 224b of the second amplifier 224 is a periodic function with a different frequency than the periodic function which is the output of the first amplifier 24.

As mentioned above, FIG. 4b illustrates the periodic function f" of the output of the second amplifier 224. Comparing FIGS. 4 and 4b, it will be appreciated that for each position, e.g. $P_1$, $P_3$ and $P_4$, where the output of the first amplifier is the same value $f_1$, the output of the second amplifier will be a non-repeating value, i.e. $f''_1$, $f''_3$, and $f''_4$. By utilizing the outputs of both amplifiers, the exact displacement of the elastic member may be determined, i.e., the weight of the applied load can be determined using a look-up table for a particular elastic member. According to the presently preferred embodiment, the transducers 20 and 220 share the same substrate and generate respective SAWs in separate channels in the substrate. Similarly, the transducers 22 and 222 share the same substrate and receive SAWs in respective substrate channels. The presently preferred frequency of the first SAW wave is 20–22 MHz and the presently preferred frequency of the second SAW wave is 18–20 MHz.

Figure 6:
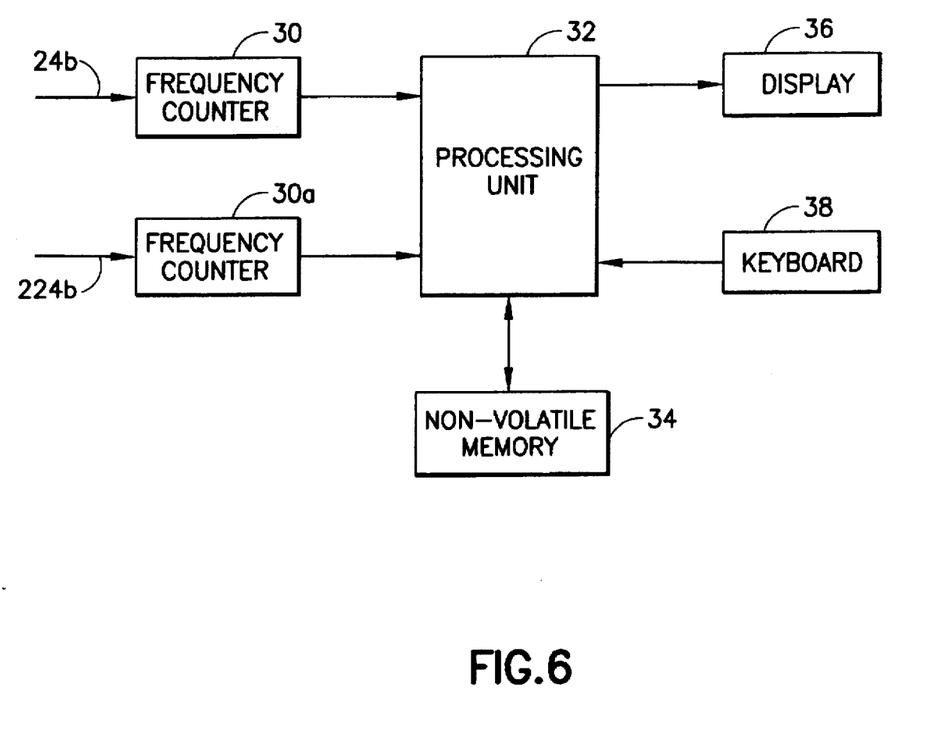
FIG. 6 is a block diagram of a circuit for determining the displacement of the transducers and thus the weight applied to the elastic member.
Figure 7:
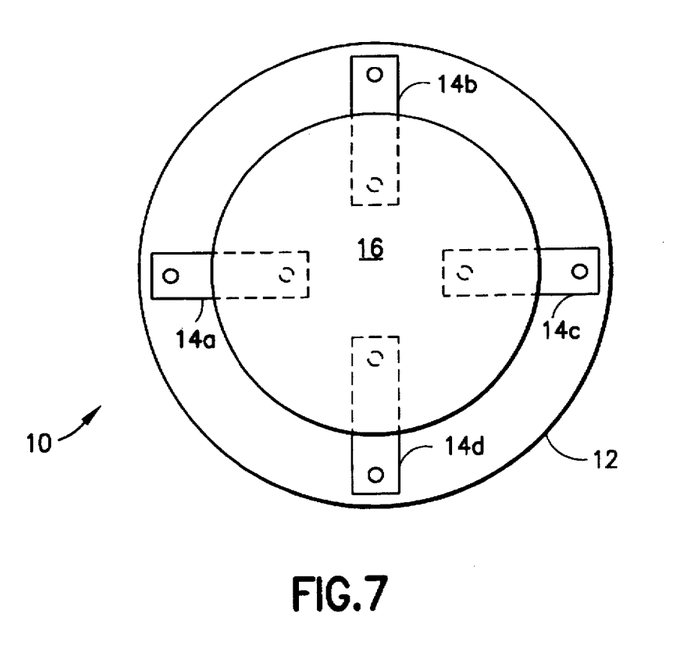
FIG. 7 is a top plan view of an embodiment of the invention utilizing four elastic members.

FIG. 6 is a block diagram illustrating how the signals from the two amplifiers 24, 224 are used to indicate the weight of an object placed on the load platform. A first frequency counter 30 determines the frequency at the output 24b of the first amplifier and a second frequency counter 30a determines the frequency at the output 224b of the second amplifier. The frequency information is supplied to a processing unit 32 which is coupled to a non-volatile memory 34 which stores a look-up table. The frequency information is compared to the look-up table which returns a weight value and the processing unit displays that value on the display 36. The operation of the processing unit 32 may be controlled by a keyboard 38 which can also be used to calibrate the look-up table. The look-up table is typically calibrated by placing known weights on the load platform and entering the weight value(s) via the keyboard 38. The processing unit stores the weight values obtained from the keyboard with the frequency values obtained from the frequency counters in the form of a look-up table in the memory 34. Frequency values and corresponding weight values which are not stored in the look-up table are obtained by interpolating the values in the look-up table. Those skilled in the art will appreciate that the processing unit may include other functions for temperature compensation, compensation for nonlinearity of the transducers/elastic member, conversion to different weight measurement units, etc. The display may be numeric, alpha-numeric, or graphical. It will also be appreciated that a single frequency counter may be used to determine the two frequencies consecutively rather than simultaneously, in which case, the processing unit will have means for switching between the amplifiers to obtain their frequencies separately. In addition, it will be understood that the look-up table may comprise one or several look-up tables.

Those skilled in the art will understand that in all weighing devices, accuracy may be compromised by incorrect placement of the load on the load platform. This is particularly so when measuring large weights which can cause an elastic member to twist. Referring now to FIG. 6, an embodiment of the weighing apparatus 10 may include a circular base 12 with four radially cantilevered elastic members 14a–14d supporting the load platform 16. Each elastic member will be provided with its own transducer circuit and the weights measured at each elastic member will be summed to obtain the correct weight of a load placed on the load platform. It will be understood that more than four or fewer than four elastic members may be used to obtain similar results.

There have been described and illustrated herein several embodiments of an electronic weighing apparatus utilizing surface acoustic waves. While particular embodiments of the invention have been described, it is not intended that the invention be limited thereto, as it is intended that the invention be as broad in scope as the art will allow and that the specification be read likewise. Thus, while particular geometries of the base, elastic member, and load platform have been disclosed, it will be appreciated that other geometries could be utilized. Also, while particular wavelengths have been disclosed, it will be recognized that other wavelengths could be used with similar results obtained. Moreover, while particular configurations have been disclosed in reference to the amplifiers and the feedback circuits, it will be appreciated that other configurations could be used as well. Furthermore, while the apparatus has been disclosed as having an elastic member which moves relative to a base member, it will be understood that arranging the base member to move relative to the elastic member can achieve the same or similar function as disclosed herein. In addition, while the elastic member has been disclosed as cantilevered, it will be understood that the elastic member and its associated transducers can be mounted in different ways so long as the displacement of the transducers is related to a weight measurement. It will therefore be appreciated by those skilled in the art that yet other modifications could be made to the provided invention without deviating from its spirit and scope as so claimed.

I claim:

1. An electronic weighing apparatus, comprising:

a) a displaceable elastic member means for receiving a load and being displaced by the load such that the displacement of said elastic member means is related to the weight of the load;

b) a first piezoelectric transducer having a first substrate and one of a first surface acoustic wave (SAW) transmitter and a first SAW receiver, said first piezoelectric transducer being coupled to said elastic member such that said displacement of said elastic member causes a corresponding displacement of said first piezoelectric transducer;

c) a second piezoelectric transducer having a second substrate and the other of said first SAW transmitter and said first SAW receiver, said second piezoelectric transducer being mounted in close proximity to said first piezoelectric transducer;

d) a first amplifier having an input and an output, said input of said first amplifier being coupled to said first SAW receiver and said output of said first amplifier being coupled to said first SAW transmitter such that said first piezoelectric transducer, said first amplifier, and said second piezoelectric transducer form a first oscillator having a first output frequency; and e) processor means coupled to said output of said first amplifier, wherein displacement of said elastic member means causes a displacement of said first piezoelectric transducer relative to said second piezoelectric transducer and thereby changes said first output frequency, and said first output frequency is used by said processor means to determine an indication of the weight of the load.

2. An apparatus according to claim 1, wherein:

said first SAW transmitter is located at a first end of said first substrate, and said first SAW receiver is located at a second end of said second substrate.

3. An apparatus according to claim 2, wherein:

said first piezoelectric transducer generates SAWs having a first wavelength, and said first piezoelectric transducer and said second piezoelectric transducer are mounted with a gap therebetween, said gap being approximately one-half to one first wavelength in size.

4. An apparatus according to claim 3, wherein:

said first wavelength is approximately 200 microns.

5. An apparatus according to claim 4, wherein:

said processor means includes frequency counter means for determining said first output frequency, memory means for storing a look-up table correlating frequency to weight, and display means for displaying weight.

6. An apparatus according to claim 1, wherein:

said processor means includes frequency counter means for determining said first output frequency, memory means for storing a look-up table correlating frequency to weight, and display means for displaying weight.

7. An apparatus according to claim 1, further comprising:

f) a third piezoelectric transducer having a third substrate and one of a second SAW transmitter and second SAW receiver, said third piezoelectric transducer being coupled to said elastic member such that said displacement of said elastic member causes a corresponding displacement of said third piezoelectric transducer;

g) a fourth piezoelectric transducer having a fourth substrate and the other of said second SAW transmitter and second SAW receiver, said fourth piezoelectric transducer being mounted in close proximity to said third piezoelectric transducer; and h) a second amplifier having an input and an output, said input of said second amplifier being coupled to said second receiver and said output of said second amplifier being coupled to said second transmitter and to said amplifier, said third piezoelectric transducer, said second amplifier, and said fourth piezoelectric transducer forming a second oscillator having a second output frequency, wherein displacement of said elastic member means causes a displacement of said third piezoelectric transducer relative to said fourth piezoelectric transducer and thereby changes said second output frequency, and said second output frequency is used by said processor means to determine said indication of the weight of the load.

8. An apparatus according to claim 5, further comprising:

i) a base member, wherein said elastic member is cantilever mounted on said base member with a free end, said first and third piezoelectric transducers are mounted on said free end, and said second and fourth piezoelectric transducers are supported by said base member.

9. An apparatus according to claim 8, wherein:

said first, second, third and fourth substrates are substantially rectangular.

10. An apparatus according to claim 7, wherein:

said processor means includes frequency counter means for determining said first output frequency and said second output frequency, memory means for storing a look-up table correlating frequencies to weight, and display means for displaying weight.

11. An apparatus according to claim 7, wherein:

said change in said first output frequency is a first periodic function, said change in said second output frequency is a second periodic function, and said first and second periodic functions have different frequencies.

12. An apparatus according to claim 11, wherein:

said processor means includes frequency counter means for determining said first output frequency and said second output frequency, memory means for storing a look-up table correlating frequencies to weight, and display means for displaying weight.

13. An apparatus according to claim 11, wherein:

said first SAW transmitter is located at a first end of said first substrate, said first SAW receiver is located at a second end of said second substrate, said second SAW transmitter is located at a first end of said third substrate, and said second SAW receiver is located at a second end of said fourth substrate.

14. An apparatus according to claim 13, wherein:

said first piezoelectric transducer generates a first surface acoustic wave having a first wavelength, said first piezoelectric transducer and said second piezoelectric transducer are mounted with a first gap therebetween, said first gap being approximately one half to one first wavelength in size, said third piezoelectric transducer generates a second surface acoustic wave having a second wavelength, said third piezoelectric transducer and said fourth piezoelectric transducer are mounted with a second gap therebetween, said second gap being approximately one half to one second wavelength in size.

15. An apparatus according to claim 14, wherein:

said first substrate is contiguous with said third substrate, and said second substrate is contiguous with said fourth substrate.

16. An apparatus according to claim 14, wherein:

said second wavelength is approximately 220 microns.

17. An apparatus according to claim 16, wherein:

said processor means includes frequency counter means for determining said first output frequency and said second output frequency, memory means for storing a look-up table correlating frequencies to weight, and display means for displaying weight.

18. An apparatus according to claim 1, further comprising:

f) a base member, wherein said elastic member is cantilever mounted on said base member with a free end, said first piezoelectric transducer is mounted on said free end, and said second piezoelectric transducer is supported by said base member.

19. An apparatus according to claim 18, wherein:

said first and second substrates are substantially rectangular.

* * * * *